June 1, 1937. B. A. PROCTOR 2,082,353
PHONOGRAPH
Filed Nov. 20, 1935 5 Sheets-Sheet 2
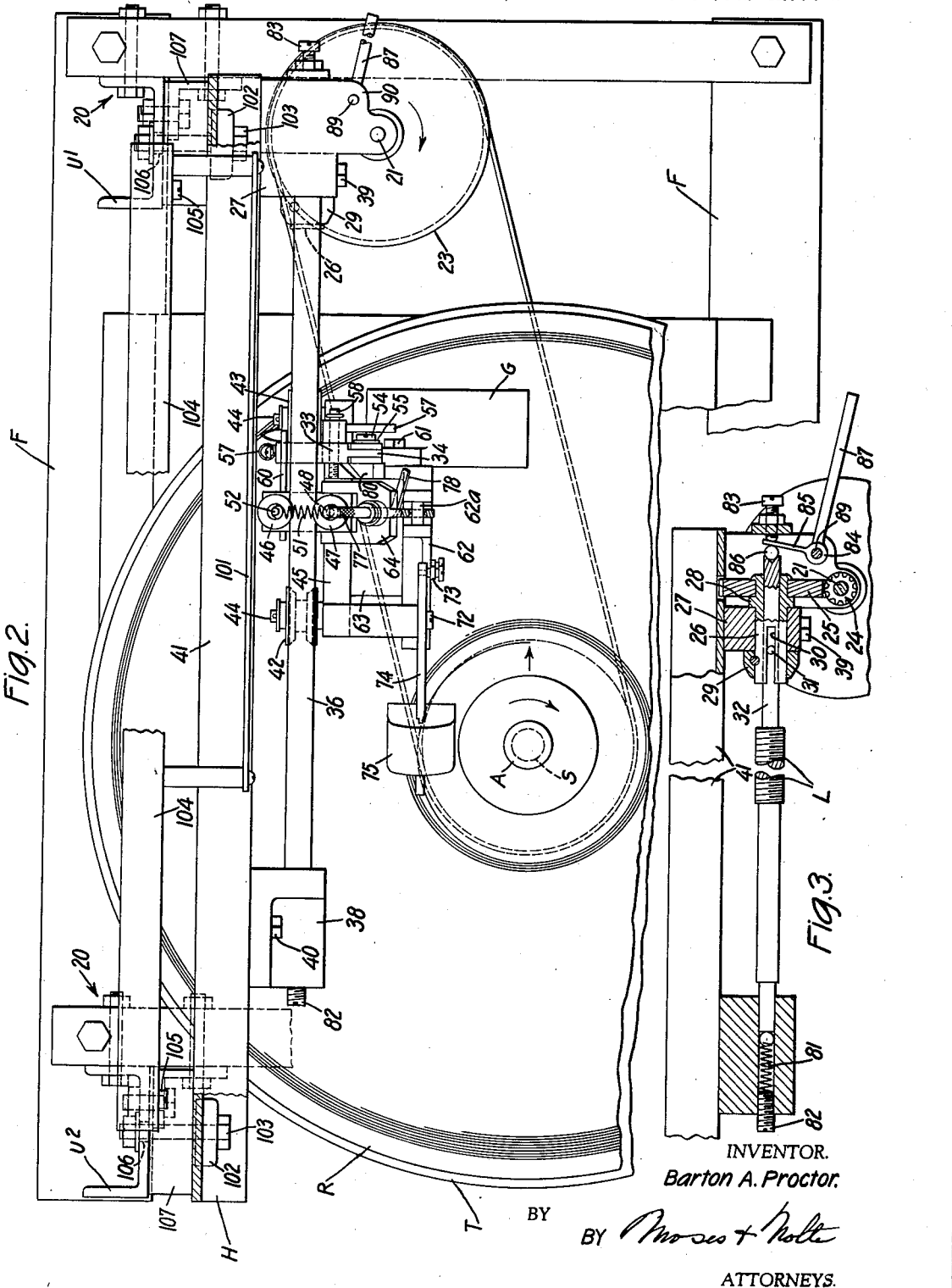
INVENTOR.
Barton A. Proctor.
BY Moses + Nolte
ATTORNEYS.

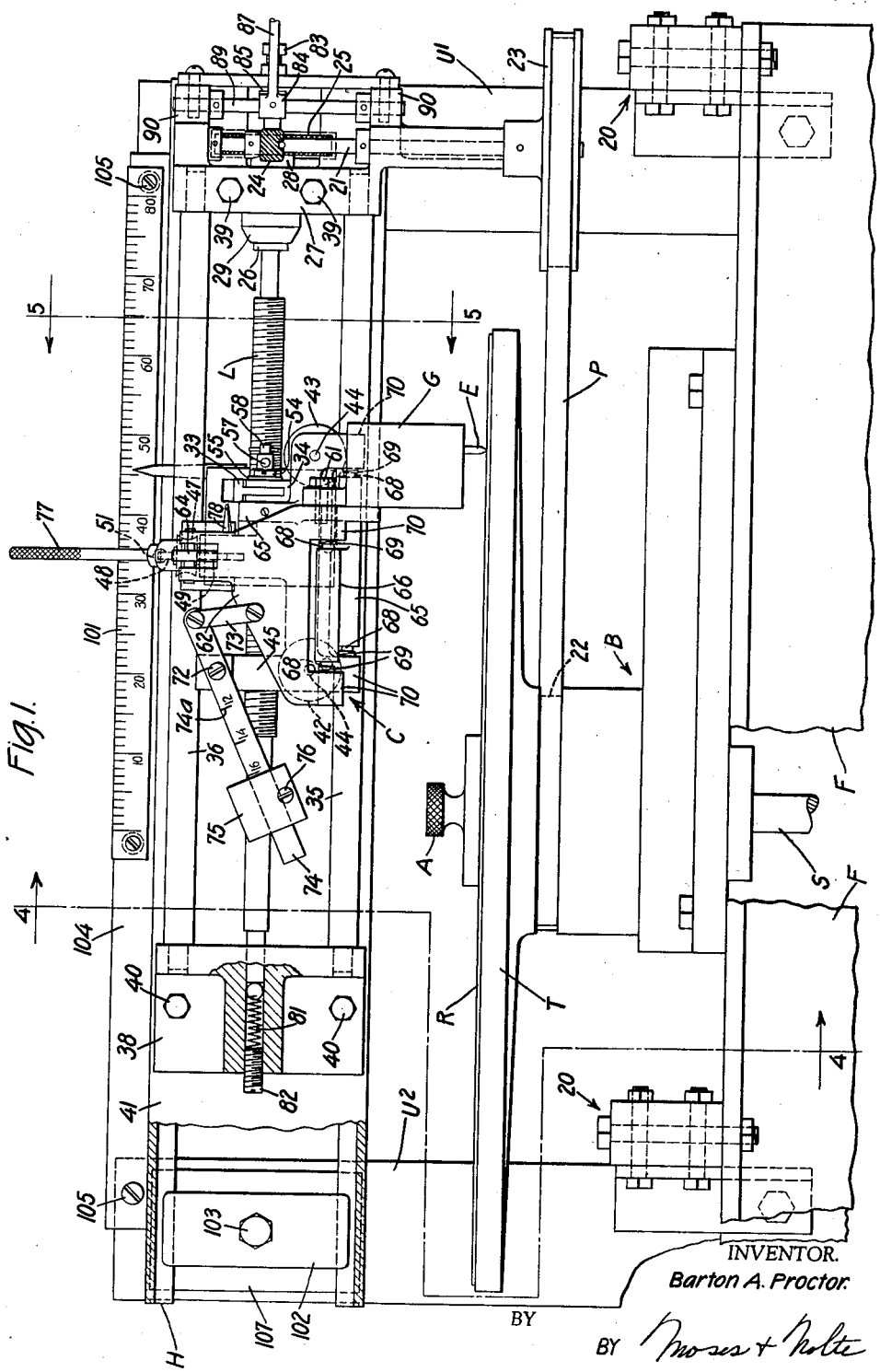

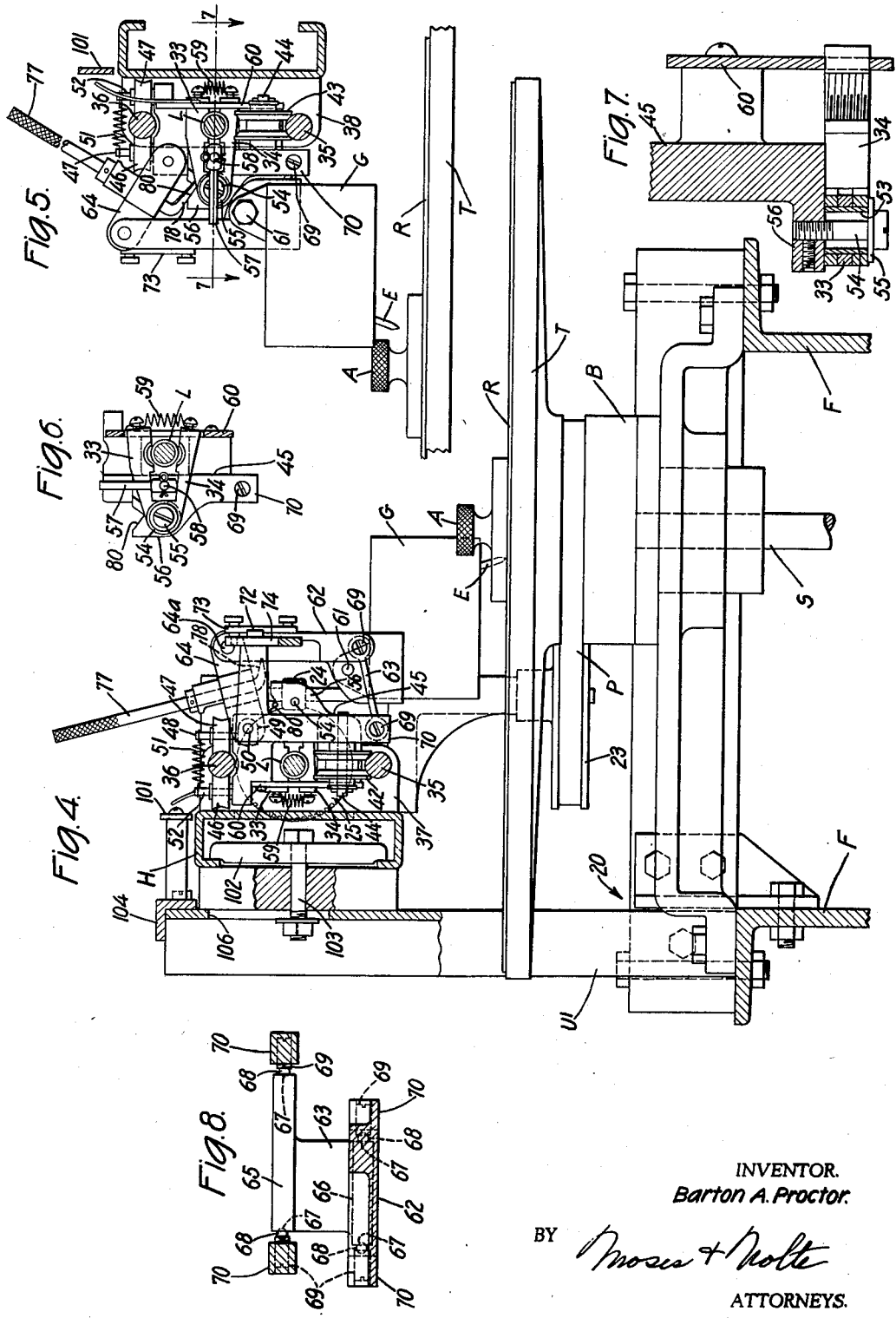

June 1, 1937.  B. A. PROCTOR  2,082,353
PHONOGRAPH
Filed Nov. 20, 1935  5 Sheets-Sheet 4
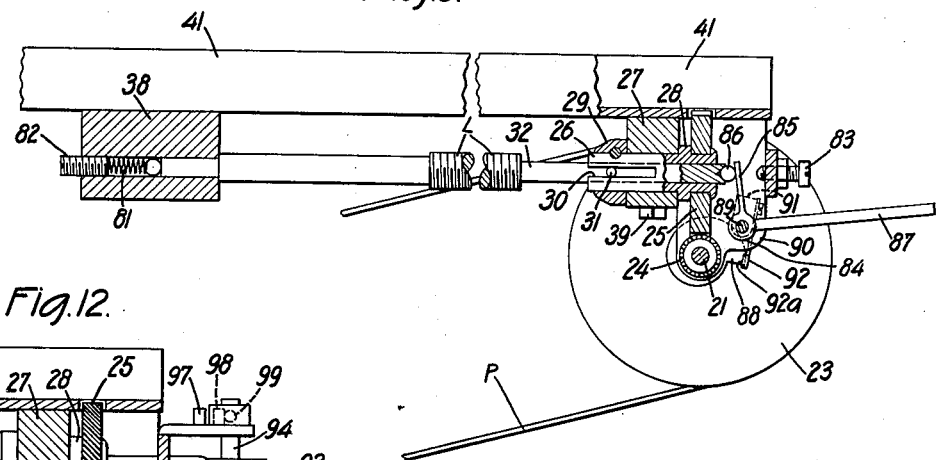
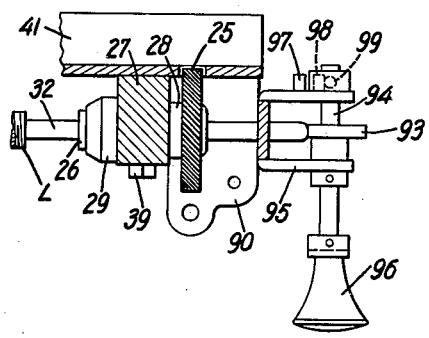
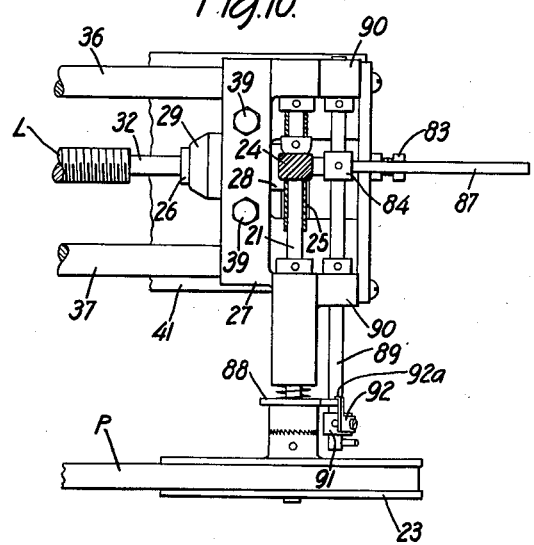
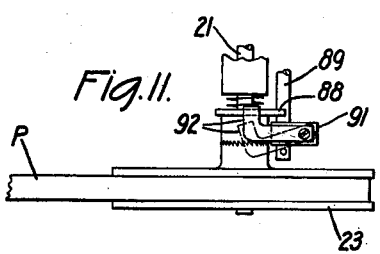
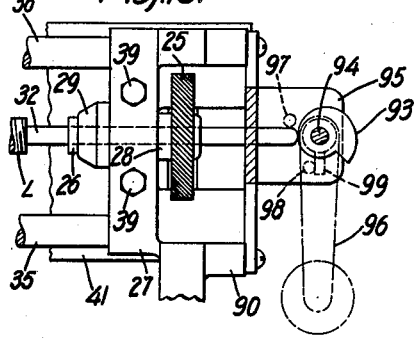
INVENTOR.
Barton A. Proctor.
BY
ATTORNEYS.

June 1, 1937.  B. A. PROCTOR  2,082,353
PHONOGRAPH
Filed Nov. 20, 1935    5 Sheets-Sheet 5

INVENTOR.
Barton A. Proctor
BY  BY *Moses & Nolte*
ATTORNEYS.

Patented June 1, 1937

2,082,353

UNITED STATES PATENT OFFICE 2,082,353

PHONOGRAPH

Barton A. Proctor, Larchmont, N. Y., assignor to B. A. Proctor Company, Inc., New York, N. Y., a corporation of New York Application November 20, 1935, Serial No. 50,703

12 Claims. (Cl. 274—9)

This invention relates to the fabrication of sound records, especially to apparatus for cutting the record upon a phonograph record blank, and more particularly to a machine adapted both to cut a record and to "play back" a record, to permit the accuracy of production to be checked readily.

An object of the invention is to provide for the support of the recording head by a parallel link motion which eliminates the objectionable frictional lag caused heretofore by the use of slides, and a cognate object is to provide for a nicely balanced cutter head support adapted to yield optimum delicacy in the cutting operation.

Another object is to provide for a type of support by ball-bearings in the above mentioned parallel link motion which compensate for minor inaccuracies in fitting together the operating parts and for aberrations due to warping of parts.

Another object is to provide a novel floating connection between the tool carriage and its feed screw such that if the feed screw be not exactly straight or not in exact parallelism with the guide rails for the tool carriage the aberration will not be communicated to the tool.

Another object is to provide for an improved three point roller bearing for the tool-carriage which will compensate for non-parallelism of the rails and feed screw or as between any of them.

Another object is to provide a simple and effective lever mechanism, operable by one of the operator's hands to raise, to lower, and to lock the cutter-head, leaving the other hand free for useful manipulation of other parts.

Still another object is to provide novel means for shifting the lead screw and its associated parts to permit production of a record which may readily itself, or a duplicate thereof, be synchronized with film and other recording media, also to provide similarly for such feed screw shifting to produce a record for use of automatic record changing mechanism in magazine phonographs.

Another object is to permit for adjustments of the overhead bridge member of such cutting machines for various purposes, (a) to vary tension on the operating belt, (b) to compensate for variations in thickness of record blanks, due to differences in materials, and other differences in structure, without disturbance of the predetermined ratios between the operating speeds of working parts, and without disturbing the fixed position of the scale relatively to the axis of rotation of the cutting system.

Other objects and advantages will appear as the description of the particular physical embodiment selected to illustrate the invention progresses, and the novel features of the invention will be particularly pointed out in the different claims.

In describing the invention in detail, and the particular physical embodiment selected to illustrate the invention, reference will be had to the accompanying drawings, and the several views thereof, wherein like characters of reference designate corresponding parts, and in which:

Fig. 1 is a view in front elevation of a record cutting machine in the construction of which the present invention has been embodied, parts thereof being shown in vertical section and other parts being broken away;

Fig. 2 is a top plan view of Fig. 1 portions being broken away and portions being shown in section;

Fig. 3 is a fragmentary detail plan view in horizontal section showing the feed screw mounting, the drive for said screw and longitudinal shifting mechanism;

Fig. 4 is a fragmentary detail view in vertical section on the line 4—4 of Fig. 1;

Fig. 5 is a view similar to Fig. 4 but taken in the opposite direction on the vertical section line 5—5 of Fig. 1, and showing the cutter head in its raised or ineffective position;

Fig. 6 is a fragmentary detail view in vertical section like Fig. 5 but showing the lead screw jaws in an open position;

Fig. 7 is a fragmentary detail view in horizontal section, taken on the line 7—7 of Fig. 5, the parts being shown upon a larger scale;

Fig. 8 is a fragmentary detail view in horizontal section, showing the lower guide link and its connection, the carriage and the cutter head support;

Fig. 9 is a view similar to Fig. 3, but illustrating a modification;

Fig. 10 is a front view of the parts shown at the right hand portion of Fig. 9;

Fig. 11 is a side view of the lower portion of Fig. 10;

Fig. 12 is a sectional top plan view of a modified hand control for the lead screw;

Fig. 13 is a front view of Fig. 2; and

Figure 14:
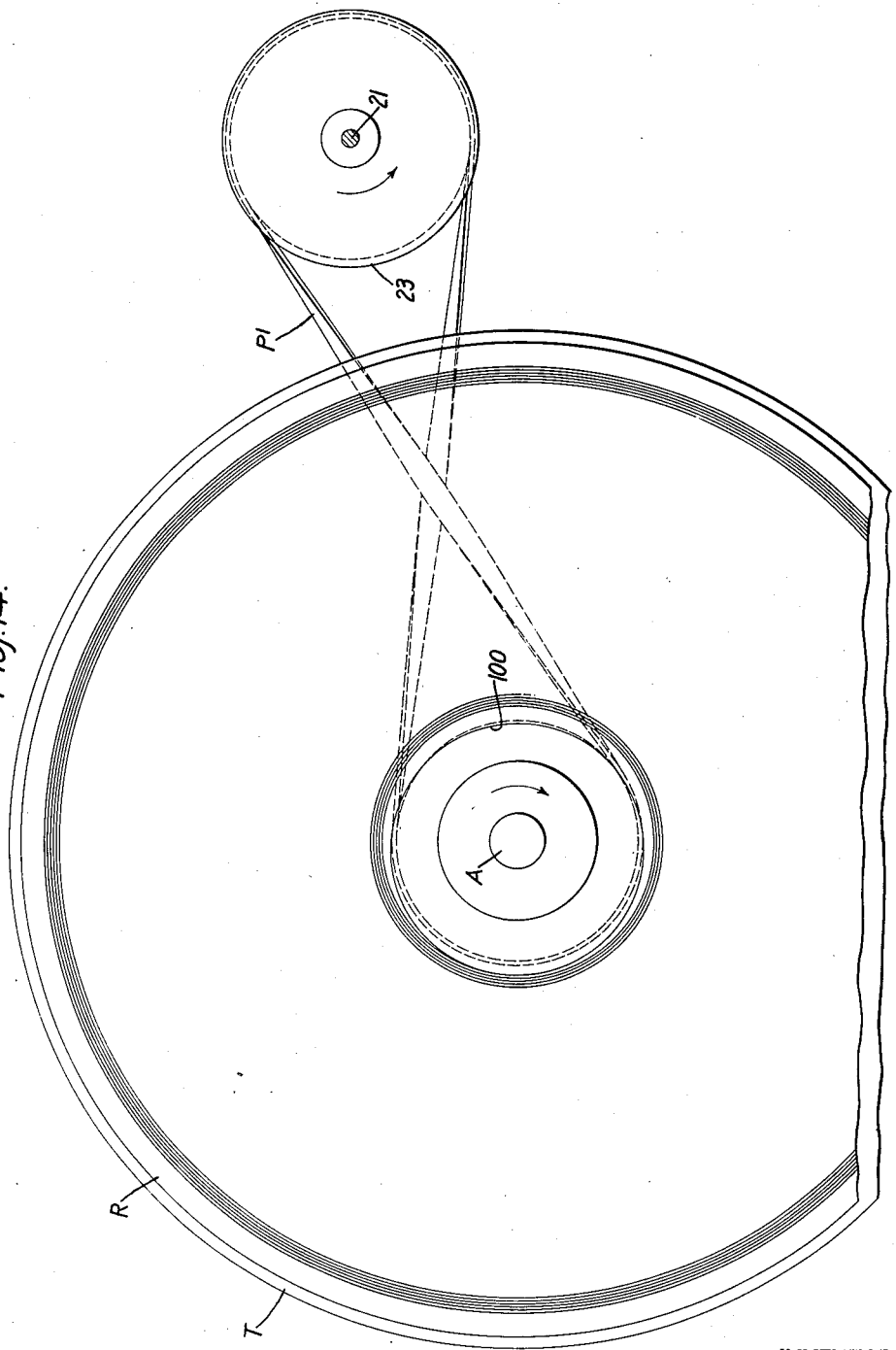
Fig. 14 is a skeleton, fragmentary detail view, in horizontal section, illustrating a modification.

In a now preferred embodiment of the invention selected for illustration and description, and having reference more particularly to the structure illustrated in Figs. 1 to 8 inclusive, the part designated generally by the reference character F therein is a frame or base adapted to support rotatably a table T carried by a vertical shaft S mounted in bearings B and driven by suitable mechanisms (not shown) for the purpose of turning the blank R on which is to cut a sound track by means of the engraving tool E carried by a head G depending from a carriage C which is movable along the bridge H transversely of the recording table T by means of a lead screw L. The bridge H is mounted on uprights U', U² extending upward from the frame F, to which they are rigidly secured, as at 20, and a power-transmitting member, as the belt P, serves to drive a counter-shaft 21 at a fixed ratio of speed determined by the relative sizes of pulleys 22 and 23, the parts so far named corresponding in general to like parts in conventional machines of the class described, although this disposition is merely illustrative and it is not intended to exclude other suitable arrangements for driving the record blank and cutting tool at suitable speed ratios.

As shown in Figs. 1 and 3, a helical gear couple 24, 25 is provided to enable the vertical shaft 21 to drive the lead screw L, the gear 25 being fixed upon a sleeve 26 which turns in a bracket 27, being held rotatively therein by a flange 28 and a removable collar 29, and in a slot 30 of this sleeve fits slidingly a stud 31, extending into the slot from a plain extension 32 of the lead screw L, which is thus adapted to have a longitudinal adjustive movement within the sleeve 26, for a purpose to be described more at length hereinafter.

Rotation of the lead screw is translated into travel of the carriage C by a pair of jaws 33, 34 (see Fig. 6) suitably threaded, in known fashion, to embrace the threaded periphery of the lead screw, and which are mounted upon the carriage by novel means which constitute an important feature of the present invention, and will be duly described, but first it is desirable that the general structure and mode of operation of the carriage should be understood, especially in its relationship to the cutter E.

In conventional machines of the class described, it is known practice to provide rails, as 35, 36 fixed respectively below and above the lead screw, and parallel therewith, in brackets, as 37 and 38, secured by bolts 39, 40 to the web 41 of the channel iron beam which constitutes the bridge H in the instance illustrated. The rails 35 and 36 are intended to be straight from end to end, and parallel with the lead screw L throughout its length. In fact, for reasons that need not be elaborated, they are seldom desirably parallel with each other, and under such conditions the carriage may bind on the rails and the cutter head G is caused to communicate to the tool E adventitious trepidations which have no proper relation to production of the sound record by means of the phonic instrumentalities within the head G, and these trepidations are highly detrimental to accurate and delicate recording, as is well known to those skilled in the art.

To eliminate the effect of such inaccuracies, the present invention provides a three point rolling contact of the carriage C with the rails 35 and 36, as by means of the upright split rollers 42 and 43 mounted upon horizontal posts 44 extending rearward from the upright body plate 45 of the carriage, and by the horizontally disposed roller couple 46, 47 which embrace between them, as they run along, the upper rail 36. The roller 47 is journalled upon a stud 48 which can oscillate on a knuckle 49 mounted on a pivot stud 50, and a tension coiled spring 51 extending between bearing studs 48 and 52 draws the roller 47 toward the roller 46 and acts to maintain both in opposed, embracing contact with rail 36, regardless of non-parallelism or irregularities in the straightness of the rails 35 and 36.

If, on the other hand, there is a departure of any of the three members L, 35, 36 from the vertical plane in which their longitudinal axes should lie, then the jaws 33, 34 will compensate therefor by reason of the novel arrangement illustrated in Fig. 7, which is characterized by the provision of an over-sized pivot sleeve 53 surrounding a capscrew 54 and washer 55 by which the sleeve is supported from a part 56 of the carriage plate 45. The jaws 34, 33 have their shanks interfitted snugly upon the sleeve 53, and constitute therewith a unitary jaw structure which floats in a plane transversely to the lead screw L but maintains its intermeshing threaded relationship with the lead screw at all times, and so insures accurate movement of the tool E steadily across the face of the record blank R.

The gripping jaws can be opened at any time manually, regardless of the position in traverse, by turning the cam lever 57 from the position in Fig. 5 to the position shown in Fig. 6, this lever being mounted on a pivot 58 carried by plate 45. A coil spring 59 draws the free ends of the jaws toward each other into engagement with the lead screw L. A slotted plate 60 secured to the plate 45 is located near the lead screw L and the rear end of said jaws extend through the slot in said plate. It will be understood that with this arrangement, should the screw L be out of parallelism with the rails 35 and 36 the jaws will always properly engage the screw L since the jaws are free to move back and forth and also up and down on the screw 54 which serves merely to maintain the ends of the jaws 33 and 34 in the slot of plate 60.

In pursuance of another important object of the invention, provision is made for elimination of the vertical aberrations of the tool E which have been caused, in known mountings, by the use of a sliding upright plunger to carry the cutter head. In the present novel mounting, the head G is secured by a stud 61 to triangular face-plate 62, and the latter is connected by parallel links 63 and 64 with the bottom and top respectively of the body plate 45 of the carrier. The preferred special form of the lower link 63 is shown most clearly in Fig. 8, and as there shown it comprises a generally rectangular planiform body portion designated 63, formed with parallel, spaced apart cylindrical enlargements 65, 66, each having, at each end a pit 67 of substantially semi-spherical contour, to serve as one side of a bearing for a ball 68, the opposed bearing faces being of similar contour formed in the ends of threaded plugs 69, screwed into appropriately threaded bores in lugs 70, at the lower ends of body plate 45 and face plate 62 respectively.

There is substantially no frictional interference with free compensating up and down relative movements between the head G and its carriage C and by reason of the four balls 68 there is minimum need for accuracy in alignments of these parts.

The upper link 64 is pivoted on the stud 50, at its rear end and is connected at its forward end with a stud 62a of the plate 62. The aperture, in the link 64, through which the stud 62a extends is countersunk from opposite sides so as to decrease to a minimum the surface of contact of the link with the stud 62a and thus prevent binding of the link on said stud in case the link is out of square with the axis of the stud. Thus this construction avoids the necessity of extreme accuracy of positioning the link 64 with reference to the stud.

Provision is made for a balance of great nicety in the support of the head G by the use of a weighted lever 74 (see Fig. 1), mounted pivotally upon the plate 45, as at 72, and having a short arm connected by link 73 with face-plate 62 of the carriage, while its longer scale arm 74 is fitted with a sliding weight 75 which may be secured in adjusted position by a set screw 76.

If the table be not exactly true, this nicety of balance compensates for differences of level as the recording (or "playing back") progresses. The arm 74 is provided with a scale 74a by which weight 75 may be set to various positions on said arm in accordance with pressure to be exerted by the tool E on the plate R since various pressures are required in accordance with the materials, such as aluminum, acetate, etc., of which the plate, upon which the recording is being done, may be composed.

Novel provision is also made for raising the cutter head and cutter from engraving position to the retracted, inoperative position illustrated in Fig. 5, and for locking it there, by a single movement of a hand lever 77, this lever being supported on the upper link 64, and having a foot 78 adapted to be swung onto an inclined face 79 (see Fig. 5) after the link 64 and face plate 62 and head G with tool E have been raised to clear the blank R completely.

This lifting movement can be effected with one hand, having the other hand free to manipulate the blank R or be otherwise occupied around the machine, and when completed, the handle 77 can be set onto the face 79 by a slight twisting movement, and there left until it is desired to lower the cutter head G which can be accomplished with equal facility by a one-handed reversal of the operation, the freedom of the other hand being especially desirable, to permit accurate emplacement of the cutter E at the starting point on an uncut blank R after the same has been placed upon the table T.

In modern playing of the record, it is highly desirable to provide for initiation of the playing in synchronism with film or other record and for this purpose it is known practice to have the table, as T, begin to rotate, with the needle set, prior to actual playing, and then to bring the needle to the desired point to begin the playing at the exact instant which corresponds with the other film or like starting point, so that the table speed will be up to the required degree when playing starts.

For the above purpose, it is desirable to provide for shifting the feed screw co-axially, in order to produce a major initial movement of the carriage, to a predetermined position for re-cording, from a readily observable predetermined starting point, on the master record R, sufficiently removed from the more closely associated track grooves eventually produced by recording proper as not to be confused therewith during the preliminary step of speeding up and synchronization.

The present invention makes provision for the above in several ways, each of which constitutes a notable improvement in accuracy, ease of manipulation, and perfection in synchronization, over the earlier known devices for this purpose, which have not been entirely satisfactory in performance.

In Fig. 3 is illustrated in detail one form of construction, which also appears in the corresponding Figs. 1 and 2, the general relation of the lead screw or feed shaft L having been already described, together with a brief reference to its capability for lengthwise movement bodily.

The shaft L is preferably biased in one direction by suitable means as by a coiled spring 81 under compression thereagainst by means of a screw plug 82 which serves to regulate the tension. An abutment screw 83 suitably mounted at the other end of the shaft limits its movements under bias. A bell-crank lever 84 has a short arm 85 bearing against a ball 86 and operable by the long handle 87 to controvert the bias and throw the shaft L toward the left.

When so thrown manually, if the cutter E be set at the point indicated by the radially disposed dart in Fig. 2, and the rotation of the machine started, an operator whose finger is actuating the handle 87, can so control movement spirally of the cutter E, as the motor and table gain speed, that by the time the record blank shall have made one complete revolution, (or more if desired), the cutter will have progressed so far radially as to occupy the proper recording position in the next full line of the spiral opposite the point of the dart.

An operator with but little training can acquire the necessary facility in this operation to produce records of more than average accuracy.

As the above operation requires a degree of attention, and care in manipulation which may often be exercised to greater advantage in other directions, the present invention includes the provision of means for regulating the release of the shaft L by a cam, after it has once been set leftward, and a convenient form of cam to accomplish this is shown at 88 in Figs. 9, 10 and 11. In general, the parts illustrated in this modification are identical in structure and function with parts designated by like characters of reference in the figures already described.

It is only necessary to add, therefore, that the cam 88 is fixed upon the shaft 21 at a convenient point, such as that illustrated in Fig. 10, and that the bell-crank lever 84 is mounted upon a rock-shaft 89 which is extended through bearings 90 to a point adjacent to the cam 88, where it is provided with a collar 91 on which is mounted pivotally a finger 92 that can be easily turned manually into a position where, as in Figs. 9 and 10 it will operate automatically to gain the effect already described.

The tendency of the finger 92 is to drop by gravity to the lower position indicated by dot and dash lines in Fig. 11. A lip 92a, Fig. 10, extends over the edge of the cam 88, during the rotation of the latter until the arm 85, of the bell crank 84, reaches the stop screw 83. The cam then leaves the finger 92 thus permitting the latter to drop to its ineffective position so as to leave the cam free to rotate with the shaft 21 during the remainder of the recording operation.

As another modification, provision may be made of a manually operable cam device which can be utilized to yield a smoother action than is produced by the device of Figure 6 without considerable training and attention and also produce another result.

In Figs. 12 and 13 this latter modification is shown in plan view and side elevation respectively, it being understood that the shaft L is mounted, as already described, for lengthwise movement.

In the present modification, a cam 93 is fixed on a shaft 94 mounted in a bearing yoke 95, and can be turned manually by a crank-handle 96, stops 97, 98 being provided to limit the range of movement of a peg 99 set in the shaft.

This form of the device has the convenience of permitting the operator to set the shaft rapidly and accurately, and then to slowly reverse the movement with great accuracy but without diverting the attention of the operator from more important duties.

The last-described modification is particularly useful when it is desired to operate the shaft L in such fashion as to produce a closed eccentric loop such as that shown in Fig. 14, instead of the open spiral of Fig. 2.

In this instance, the belt P' is shown as crossed, in order to cause the cutter to traverse the record from the periphery toward the centre, the purpose of the eccentric loop at 100 being to actuate mechanism (not shown) in a magazine phonograph, wherein after one record has been played, it will be substituted automatically by an unplayed record.

It will be understood that this form of the invention which includes the cam 93 may also be used instead of the mechanism illustrated in Figs. 1, 2 and 3, to produce the spiral formed by said mechanism.

In pursuance of another object of the present invention, provision is made of means to adjust the bridge H to different positions laterally, while maintaining the conventional scale 101 in fixed relation to the axial point A of the machine.

The purpose of such adjustment is to effect changes of tension upon the driving belt readily without affecting the speed of rotation, and for the above purpose, the bridge member H is held, as shown in Figs. 1 and 4, by clamps 102 and bolts 103, which may be loosened and reset when the necessary shifting of the channel piece H has to be made. Meanwhile the scale 101 remains in its fixed position, as its support 104 is secured by screws 105 to the upper ends of the uprights U' and U² respectively.

This arrangement is not intended to exclude any adjustment of the scale or its supporting member for purposes of calibration and other adjustments are within the scope of the present invention.

As an example of one such adjustment, Fig. 4 shows at 106 a slot in the upright U' which receives the bolt 103, the latter passing through a spacer block 107 intervening between the upright and the bridge channel H and clamp 102.

By this means the bridge may be lowered or raised to compensate for differences in the thickness of the blanks R, which sometimes vary according to their materials.

It will be understood in order to "play back" while the master record is being made a reproducer such as illustrated in my application Ser. No. 722,110, filed April 24, 1934, may be used.

I have described what I believe to be the best embodiments of my invention. I do not wish, however, to be confined to the embodiments shown, but what I desire to cover by Letters Patent is set forth in the appended claims.

I claim:

1. A machine of the class described, characterized by a rotating table for a record blank, a supporting frame therefor, a bridge extending from said frame over said table, rails and a feed-screw mounted on said bridge, and a carriage running on said rails and adapted to be actuated by said feed-screw to traverse said table in combination with an operating instrument, and means to rotate said table and to cause traversing movement of said carriage at a predetermined speed ratio; said machine being further characterized by having said carriage mounted upon said rails with a three-point rolling engagement adapted to compensate for non-parallelism of said rails and thereby to promote steady engagement of said operating instrument with said record member, said three-point contact being effected by providing a pair of said contact members disposed on opposite sides of one of said rails and each biased yieldingly toward said rail.

2. A machine of the class described, characterized by a rotating table for a record blank, a supporting frame therefor, a bridge extending from said frame over said table, rails and a feed-screw mounted on said bridge, and a carriage running on said rails and adapted to be actuated by said feed-screw to traverse said table in combination with an operating instrument, and means to rotate said table and to cause traversing movement of said carriage at a predetermined speed ratio; said machine being further characterized by having said carriage connected operatively with said feed-screw by a floating jaw adapted to compensate for non-parallelism as between said feed-screw and said rails, while maintaining at all times proper threaded engagement with said feed-screw.

3. A machine of the class described, characterized by a rotating table for a record blank, a supporting frame therefor, a bridge extending from said frame over said table, rails and a feed-screw mounted on said bridge, and a carriage running on said rails and adapted to be actuated by said feed-screw to traverse said table in combination with an operating instrument, and means to rotate said table and to cause traversing movement of said carriage at a predetermined speed ratio; said machine being further characterized by having said carriage and said instrument head connected with each other by a parallel link suspension.

4. A machine of the class described, characterized by a rotating table for a record blank, a supporting frame therefor, a bridge extending from said frame over said table, rails and a feed-screw mounted on said bridge, and a carriage running on said rails and adapted to be actuated by said feed-screw to traverse said table in combination with an operating instrument, and means to rotate said table and to cause traversing movement of said carriage at a predetermined speed ratio; said machine being further characterized by having said carriage and said instrument head connected with each other by a parallel link suspension and also by means to counterbalance said head and thereby to promote delicacy in the operation of the instrument carried by said head.

5. A machine of the class described, characterized by a rotating table for a record blank, a supporting frame therefor, a bridge extending from said frame over said table, rails and a feed-screw mounted on said bridge, and a carriage running on said rails and adapted to be actuated by said feed-screw to traverse said table in combination with an operating instrument, and means to rotate said table and to cause traversing movement of said carriage at a predetermined speed ratio; said machine being further characterized by a single lever operable by one of the operator's hands and connections operated selectively thereby to raise, to lock, and to lower, said instrument head, leaving the other hand of the operator free to manipulate the other parts of the machine and the record member.

6. A machine of the class described, characterized by a rotating table for a record blank, a supporting frame therefor, a bridge extending from said frame over said table, rails and a feed-screw mounted on said bridge, and a carriage running on said rails and adapted to be actuated by said feed-screw to traverse said table in combination with an operating instrument, and means to rotate said table and to cause traversing movement of said carriage at a predetermined speed ratio; said machine being further characterized by having said feed-screw movable bodily lengthwise with said carriage, and by means to bias said screw bodily in one direction, and manually operable means to controvert said bias, first setting said screw bodily in reverse direction for a predetermined distance and then to release the screw, permitting the bias to become effective gradually to restore the screw to its normal biased position.

7. A machine of the class described, characterized by a rotating table for a record blank, a supporting frame therefor, a bridge extending from said frame over said table, rails and a feed-screw mounted on said bridge, and a carriage running on said rails and adapted to be actuated by said feed-screw to traverse said table in combination with an operating instrument, and means to rotate said table and to cause traversing movement of said carriage at a predetermined speed ratio; said machine being further characterized by having said feed-screw movable bodily lengthwise with said carriage, and by means to bias said screw bodily in one direction, and manually operable means to controvert said bias, first setting said screw bodily in reverse direction for a predetermined distance and then to release the screw, permitting the bias to become effective gradually to restore the screw to its normal biased position and a cam device adapted to govern said release.

8. A machine of the class described, characterized by a rotating table for a record blank, a supporting frame therefor, a bridge extending from said frame over said table, rails and a feed-screw mounted on said bridge, and a carriage running on said rails and adapted to be actuated by said feed-screw to traverse said table in combination with an operating instrument, and means to rotate said table and to cause traversing movement of said carriage at a predetermined speed ratio; said machine being further characterized by having said feed-screw movable bodily lengthwise with said carriage, and by means to bias said screw bodily in one direction, and manually operable means to controvert said bias, first setting said screw bodily in reverse direction for a predetermined distance and then to release the screw, permitting the bias to become effective gradually to restore the screw to its normal biased position, and a cam device adapted to govern said release automatically.

9. A machine of the class described, characterized by a rotating table for a record blank, a supporting frame therefor, a bridge extending from said frame over said table, rails and a feed-screw mounted on said bridge, and a carriage running on said rails and adapted to be actuated by said feed-screw to traverse said table in combination with an operating instrument, and means to rotate said table and to cause traversing movement of said carriage at a predetermined speed ratio; said machine being further characterized by having said feed-screw movable bodily lengthwise with said carriage, and by means to bias said screw bodily in one direction, and manually operable means to controvert said bias, first setting said screw bodily in reverse direction for a predetermined distance and then to release the screw, permitting the bias to become effective gradually to restore the screw to its normal biased position and a cam device adapted to govern said release and means to set said cam device selectively for operation and in an inoperative position.

10. A machine of the class described, characterized by a rotating table for a record blank, a supporting frame therefor, a bridge extending from said frame over said table, rails and a feed-screw mounted on said bridge, and a carriage running on said rails and adapted to be actuated by said feed-screw to traverse said table in combination with an operating instrument, and means to rotate said table and to cause traversing movement of said carriage at a predetermined speed ratio; said machine being further characterized by means to permit bodily lateral adjustment of said bridge lengthwise.

11. A machine of the class described, characterized by a rotating table for a record blank, a supporting frame therefor, a bridge extending from said frame over said table, rails and a feed-screw mounted on said bridge, and a carriage running on said rails and adapted to be actuated by said feed-screw to traverse said table in combination with an operating instrument, and means to rotate said table and to cause traversing movement of said carriage at a predetermined speed ratio; said machine being further characterized by a scale mounted on said frame in fixed relation to the axis of rotation of said table, and independently of said bridge, and means to permit bodily lateral adjustment of said bridge lengthwise, while maintaining the established position of said scale.

12. A machine of the class described, characterized by a rotating table for a record blank, a supporting frame therefor, a bridge extending from said frame over said table, rails and a feed-screw mounted on said bridge, and a carriage running on said rails and adapted to be actuated by said feed-screw to traverse said table in combination with an operating instrument, and means to rotate said table and to cause traversing movement of said carriage at a predetermined speed ratio; said machine being further characterized by a scale mounted in predetermined position independently of said bridge, and by means to adjust said bridge vertically with respect to said table and also with respect to said scale.

BARTON A. PROCTOR.